(12) United States Patent
Cevada Maya et al.

(10) Patent No.: US 10,213,708 B2
(45) Date of Patent: Feb. 26, 2019

(54) FORMULATIONS OF HOMOPOLYMERS BASED ON ALKYL ACRYLATES USED AS ANTIFOAMING AGENTS IN HEAVY AND SUPER-HEAVY CRUDE OILS

(71) Applicant: INSTITUTO MEXICANO DEL PETROLEO, Mexico City (MX)

(72) Inventors: Enrique Cevada Maya, Mexico City (MX); Laura Veronica Castro Sotelo, Mexico City (MX); Edgar Ivan Hernandez Carbajal, Mexico City (MX); Cesar Andres Flores Sandoval, Mexico City (MX); Alfonso Lopez Ortega, Mexico City (MX); Aristeo Estrada Buendia, Mexico City (MX); Fernando Alvarez Ramirez, Mexico City (MX); Arquimedes Estrada Martinez, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 368 days.

(21) Appl. No.: 14/560,179

(22) Filed: Dec. 4, 2014

(65) Prior Publication Data

US 2015/0157961 A1    Jun. 11, 2015

(30) Foreign Application Priority Data

Dec. 6, 2013 (MX) .................... MX/a/2013/014352

(51) Int. Cl.
*C10G 29/22* (2006.01)
*B01D 19/04* (2006.01)

(52) U.S. Cl.
CPC ......... *B01D 19/0404* (2013.01); *C10G 29/22* (2013.01)

(58) Field of Classification Search
CPC .... C09K 8/588; C09K 2208/06; C10G 29/22; C10G 33/04; C10G 2300/201; B01D 19/0404; F15D 1/02
See application file for complete search history.

(56) References Cited

U.S. PATENT DOCUMENTS

| | | |
|---|---|---|
| 2,702,793 A | 2/1955 | Smith |
| 2,862,885 A | 12/1958 | Nelson et al. |
| 3,166,508 A | 1/1965 | Fields |
| 3,951,929 A | 4/1976 | Sweeney |
| 4,005,044 A | 1/1977 | Raleigh |
| 4,329,528 A | 5/1982 | Evans |
| 5,169,560 A | 12/1992 | Hart |
| 5,296,132 A | 3/1994 | Hart |
| 5,389,299 A | 2/1995 | Hart |
| 5,472,637 A | 12/1995 | Hart |
| 5,750,052 A | 5/1998 | Hart et al. |
| 5,766,513 A | 6/1998 | Pillon et al. |
| 5,800,738 A | 9/1998 | Hart |
| 6,001,140 A | 12/1999 | Grabowski et al. |
| 7,308,938 B1 | 12/2007 | Chatterji et al. |
| 7,517,836 B2 | 4/2009 | Chatterji et al. |
| 7,700,527 B2 | 4/2010 | Fang et al. |
| 7,863,225 B2 | 1/2011 | Chatterji et al. |
| 2010/0292380 A1* | 11/2010 | Martin ............... B01D 19/0404 524/314 |
| 2011/0067295 A1 | 3/2011 | Castro Sotelo et al. |

FOREIGN PATENT DOCUMENTS

EP          1029030          8/2000

* cited by examiner

*Primary Examiner* — Peter D. Mulcahy
(74) *Attorney, Agent, or Firm* — Dickinson Wright PLLC

(57) ABSTRACT

The present invention relates to the application based on alkyl acrylate homopolymers, such as antifoaming agents in crude oils with densities of 10 to 40° API. Evaluation tests in "live" crude oil, under similar gas-liquid separation equipment conditions, showed that these polymers based on alkyl acrylate are effective foaming inhibitors in heavy and super-heavy crude oils, reducing the foam between 15 and 50% faster compared to crude oil without an antifoaming agent. Some acrylics show better performance than commercial silicon-based polymers, which suppress foam 20-25% faster than the blank. The antifoaming agents of this invention, based on alkyl acrylate and totally free of silicon, is an advantageous option, to replace the silicone-based foam inhibitors currently on the market.

14 Claims, 8 Drawing Sheets

FORMULATIONS OF HOMOPOLYMERS BASED ON ALKYL ACRYLATES USED AS ANTIFOAMING AGENTS IN HEAVY AND SUPER-HEAVY CRUDE OILS

CROSS-REFERENCE TO RELATED APPLICATION

This application claims the benefit and priority under 35 U.S.C. § 119 to Mexican Patent Application No. MX/a/2013/014352 with a filing date of Dec. 6, 2013, the disclosure of which is incorporated herein by reference in its entirety.

FIELD OF THE INVENTION

The present invention is directed to the field of chemical products to control the foam that is formed in crude oil, particularly from free-silicon antifoaming agents. This invention is directed to homopolymers based on alkyl acrylate, silicon-free, and their use to inhibit or suppress the foam formation in the gas-liquid separation apparatus for petroleum or crude oils with densities of 10 to 40° API.

BACKGROUND OF THE INVENTION

The principal problems that occur during the extraction and transportation of crude oil is the foam formation, due to the presence of gas. In general, the greater tendency to foaming and foam collapse occurs in crude oils with lower density to 40 degrees API. Foaming phenomena, substantially, cause operational problems such as: low productivity, pump cavitation (Fallin et al, 1971), deposit formation, liquid sweeping into the gas streams, water and gas sweeping into the crude oils streams and reduction of the separator capacity (Wylde et al, 2008). Depending on the nature of the crude oil and the type of separators used, the problems of foaming (sweeping of liquid in gas streams and entrance of gas into flows of fluid) can reduce the crude oil production and even cause unexpected shutdowns of the process. The problems result in equipment and containers inundations, but also these situations can cause reductions in the capacity of crude oil and gas separators. (Poindexter et al, 2002).

An antifoaming agent is a chemical substance with surfactant properties (change in the surface tension) which when present in a solution facilitates the foam removal. The antifoaming agent must be insoluble in the crude oil, causing sudden gradients in the oil-gas surface tension, should not be sensitive to changes in temperature, and must be resistant to chemical and oxidative attack. (R. Prud'homme et al, 1996). Crude oil or petroleum (literally means "rock oil") is a mixture of hydrocarbon compounds, gases and liquids. Usually crude oil is liquid, is contained in deposits of sedimentary rocks and may also contain small amounts of sulfur compounds, nitrogen, oxygen and metal traces. (Speight J., 2001).

Foam formation inhibition in crude oils is a highly complex multifactorial problem. The literature reports that an efficient antifoam agent needs to penetrate the gas/crude oil interface and to disperse it over the crude oil surface. (Blute et al, 1994). Among commercially products used as antifoaming agents for crude oils can be mentioned the following: silicones and fluorosilicones, phosphate esters, metallic fatty acid surfactants, sulfonated compounds, amides, polyglycols, glycolic esters, polyethers, esters of fatty acids and alcohols (Prod'homme et al, 1996). Among the most used are silicone based products because of their high antifoaming ability, due to the fact that these chemicals are effective at low concentrations around 10 ppm or less. However, silicon based antifoaming agents in large amounts present problems such as catalysts poisoning in refining processes and the formation of deposits in other subsequent steps.

Traditionally, silicone (dimethyl polysiloxane) was used for the treatment of foam inhibition. In U.S. Pat. No. 2,702,793, a mixture of dimethyl silicone and amyltriethoxysilane is used for inhibiting foam formation in crude oils. Similarly, U.S. Pat. No. 2,862,885 describes the use of monovinylalkoxysilane as antifoaming agent in crude oil. In contrast, U.S. Pat. No. 4,005,044 discloses the use of a dimethylpolysiloxane liquid as an antifoaming agent in a solution of emulsifying agent.

In order to improve the performance of the polysiloxanes as antifoaming agents, chemical modifications have been made to these polymers. Chemical modification is to obtain copolymers such as the linear copolymer fluoro-alkyl polysiloxane, as disclosed in U.S. Pat. No. 4,329,528, with a composition between 20-70% mol of fluorosilicone, presenting a great performance at high temperatures (in the range from 25 to 370° C.) and good solubility in crude oil. This copolymer is used in crude reserves as a method to inhibit or suppress foam formation, adding at least 1 ppm of the antifoaming agent (Evans, 1982).

WO 97/38067 and U.S. Pat. No. 6,001,140 describes the use of copolymers, which have a base structure consisting of polysiloxane and to which is grafted an organic group, particularly a polymer with the formula $MD_xD'_yD''_zM$ where M is $O_{0.5}Si(CH_3)_3$, D is a $OSi(CH_3)_2$, D' is $OSi(CH_3)R$ and D" is $OSi(CH_3)R'$. At the same time, R is a polyhydric organic group, $C_6$-$C_{28}$, while R' is a phenol derivative or a long chain aliphatic group.

Cassani F. et al. presented laboratory and field studies in the evaluation of six commercial silicon based antifoaming agents in medium density crude oils (21 to 27° API), and the optimal doses for controlling the foam generated in the separation equipment. The optimal dosages for these silicon based antifoaming agents (formulation containing between 2 and 4% of silicon in kerosene as solvent) in a medium crude oil of 26.3° API, were found to be in a range from 0.01 to 1 ppm in laboratory tests. These doses were corroborated at field level.

Due to operational difficulties involved with the use of silicon based products, some have sought new alternatives of free-silicon compounds, to evaluate them as antifoaming agents in crude oil. Those antifoaming agents called "free-silicon" are organic compounds consisting essentially of sulphates and phosphates (Hart, 1992), vegetable oils (Hart, 1994) and animal oils (Hart, 1995), compounds of polyisobutylene (Hart, 1995 and Hart, 1998), block copolymers of polypropylene oxide/polyethylene oxide (Hart, 1998) and mixtures thereof.

Vegetable oils such as jojoba oil (*Simmondsia chinensis*) and animal oils such as mink oil (*Neovison vison*) have been used to control foam at high temperatures (150 to 500° C.) in hydrocarbon fluids, during the distillation and/or delayed coking crude oil processes, as indicated in U.S. Pat. No. 5,296,132 and U.S. Pat. No. 5,389,299, respectively. Effective doses like antifoaming agents in the patents cited ranged from 10 to 1000 ppm (Hart, 1994, 1995) and given the low viscosity of these products may be added in pure form or in solution.

U.S. Pat. No. 5,472,637 and U.S. Pat. No. 5,800,738 describe the use of polyisobutylene of high molecular weight (between 2000 and 2 000 000 Daltons) and low molecular weight (320), being effective as antifoaming agents in crude oil and/or in its derivatives.

Alkoxylated alkylphenol/formaldehyde block copolymer compounds of propylene oxide/ethylene oxide, with molecular weights between 2000 to 6000 Daltons were developed for foaming control in separation systems of hydrocarbons hydrocracking in doses from 15 to 1500 ppm as disclosed in U.S. Pat. No. 5,750,052.

Drilling or well treatment methods have been developed that prevent the formation or breaking of foam, treated fluid is a liquid that is added with an anti-foaming agent. The antifoaming agent composition may be useful in the preparation of the well (drilling fluids, fluid foundation, etc.). This simple addition prevents foaming and air swept during stirring, mixing or pumping fluids like them. The composition of these antifoaming agents comprises a carboxylic acid amide, a propylene glycol, and a fatty alcohol ($C_{12-15}$) ethoxylated and propoxylated (Chatterji, 2007, 2009, 2011).

Rezende D. A., et al. evaluated the efficiency of commercial antifoaming agents, such as poly (ethylene oxide) poly (propylene oxide) block copolymer and polyether grafted polysiloxanes in two crude oil samples with SARA compositions (analysis of saturates, aromatics, resins and asphaltenes), like as well as its density and viscosity, (Danielle, 2011). Polysiloxanes grafted with polyether like pendant groups showed the best performance as foam inhibitors in crude oil.

Wylde J. has studied foaming in crude oils from northern Alberta, Canada, with densities of 10 to 12° API. However, using the evaluation method for foaming described in their study (modified from the ASTM D892-13 standard method) and due to the high viscosity of super-heavy crude oil selected to evaluate (12° API), it was not feasible to create significant levels of foam to perform evaluations of the antifoaming agents under study. To overcome this difficulty, a substantial amount of n-heptane was added to the super-heavy crude oil in order to create an artificial light crude oil of lower viscosity and thus be able to measure the foam inhibitory efficiency from antifoaming agents. Clearly, the addition of n-heptane leads to loss of the asphaltenes in the crude oil. Antifoaming agents studied were all free-silicon chemical compounds: compounds based on sulfates and phosphates, ethoxylated esters, polyethylene glycol esters, ethoxylated alcohols (11 commercial chemical products obtained from the market). Field tests were shown to be effective as antifoaming agents mixtures of sulfonated salts and ethoxylated fatty alcohol adducts of ethylene oxide and propylene oxide. One limitation of this study is that the above chemicals are only effective as antifoaming agents in deasphalting crude oil and not in real heavy crude oils.

As regards on polyacrylates or acrylic, there are several references to its application in the conditioning of petroleum and its derivatives. Its capacity has been reported as antifoaming agents in oil derivatives from petroleum, such as: lubricating oils for internal combustion engines, pumps lubricant oils, hydraulic oils, etc. These lubricants may be synthetic or natural, as described in U.S. Pat. No. 3,166,508. The major efficiency of polyacrylates as antifoaming agents in petroleum derivative lubricating oils is observed at concentrations of 10 to 50 ppm. However, polyacrylates disclosed in this patent have the disadvantage of being effective only in certain types of oil. The patent to which it is referenced do not make mention of the application of polyacrylates as antifoaming agents in any crude oil conditioning process. This patent does not disclose adjusting the molecular weight of the polyacrylates in order to increase their efficiency as antifoaming agents in specific samples of crude oil. U.S. Pat. No. 5,766,513 describes a combination of a fluorosilicone base antifoaming agent with one based on polyacrylate which is effective to reduce the foam in lubricant oils at low and high. However, by themselves, none is efficient in reducing foam at evaluation conditions. In the other hand, it has been reported that acrylates copolymers and terpolymers (mainly from alkyl methacrylate type monomers, wherein the alkyl moiety contains a fluoroaliphatic group of 3 to 20 carbon atoms) have shown to increase the resistance to foaming once they are added to hydrocarbon lubricant oils. The copolymers and terpolymers based on acrylates are disclosed in U.S. Pat. No. 7,700,527 and EP 1029030, respectively.

Among other applications of the polyacrylates for petroleum conditioning, different to the inhibition of the formation of foams, their use as pour point depressor in crude oils with high content in paraffinic waxes as disclosed in U.S. Pat. No. 3,951,929. Acrylics also have shown high performance as viscosity reducers in heavy crude oils, such as described in U.S. Patent Publication No. 2011/0067295 (Castro, 2011).

REFERENCES

Castro L. V., Flores E. A., Cendejas G., Lozada M. and Vazquez F. S., "Formulations of random polymers for improving crude petroleum flow", U.S. Patent Application 2011/0067295A1, Mar. 24, (2011).

Estrada B. A., Cevada E., Castro L. V., Flores C., López A., Álvarez F., Estrada A. and Vázquez F., "Aparato para medir espuma", Solicitud de patente mexicana MX/a/2013/013966, Nov. 28, (2013).

Fallin S., Sharp S. P. and Wolfe J. L., "*Defoaming agents for increased oil production rates of foamy crudes*", SPE 2841, *J. Petrol. Technol.*, 23, 233-238, (1971).

Poindexter M. K., Zaki N. N., Kilpatrick P. K., Marsh S. C. and Emmons D. H., "*Factors contributing to petroleum foaming. 1. Crude oil systems*", Energy and Fuels, 16, 700-710, (2002).

Speight J. G., "*Handbook of petroleum analysis*", Wiley Interscience, U.S.A., pp 1, 61, (2001)

Blute I., Jannson M., Oh S. G. and Shah D. D., "*The molecular mechanism for destabilization of foam by organic ions*", J. Amer. Oil. Chem. Soc., 71, 41-46, (1994).

Prud homme R. K. and Khan S. A., "*Foams, theory, measurement and applications*", Marcel Deckker Inc, New York, pp 480-493, (1996).

Smith W. R., "Foam-inhibiting and foam-inhibited compositions", U.S. Pat. No. 2,702,793, Feb. 22, (1955).

Nelson R. S., Larchmont and Charles W., "Foam inhibition in hydrocarbon oils", U.S. Pat. No. 2,862,885, Dec. 2, (1958).

Raleigh W. J., "Method of making aqueous antifoam compositions", U.S. Pat. No. 4,005,044, Jan. 25, (1977).

Evans E. R., "*Method of defoaming crude hydrocarbon stocks with fluorosilicone compounds*", U.S. Pat. No. 4,329,528, May 11, (1982).

Cassani F. and Ortega P., Intevep, S. A., Davila A. and Rodriguez W., Lagoven, S. A., and Serrano J., Corpoven, S. A. "Evaluation of Foam Inhibitors at the Jusepin Oil/Gas Separation Plant, El Furrial Field, Eastern Venezuela", Society of Petroleum Engineering, (1992).

Grabowski et al., "Diesel fuel and lubricating oil antifoaming and methods of use", U.S. Pat. No. 6,001,140, Dec. 14, (1999).

Hart P. R., "*Control of foam in hydrocarbon fluids*", U.S. Pat. No. 5,169,560, Dec. 8, (1992).

Hart P. R., "*High temperature hydrocarbon defoamer composition and method*", U.S. Pat. No. 5,296,132, Mar. 22, (1994).

Hart P. R., "*High temperature hydrocarbon defoamer composition and method*", U.S. Pat. No. 5,389,299, Feb. 14, (1995).

Hart P. R., "*Control of foam in hydrocarbon fluids*", U.S. Pat. No. 5,472,637, Dec. 5, (1995).

Hart P. R. and Dion M. A., "*Foam control method*", U.S. Pat. No. 5,750,052, May 12, (1998).

Hart P. R., "*Methods for inhibiting foam in crude oils*", U.S. Pat. No. 5,800,738, Sep. 1, (1998).

Chatterji J. and King B. J., "*Defoaming methods and compositions*", U.S. Pat. No. 7,308,938, Dec. 18, (2007).

Chatterji J. and King B. J., "*Defoaming methods and compositions*", U.S. Pat. No. 7,517,836, Apr. 14, (2009).

Chatterji J. and King B. J., "*Defoaming methods and compositions*", U.S. Pat. No. 7,863,225, Jan. 4, (2011).

Rezende, D. A., Bittencour, Rafael R., Mansur, Claudia R. E., "*Evaluation of the efficiency of polyether-based antifoams for crude oil*", Journal of Petroleum Science and Engineering, (2011).

Wylde J. J., "*Successful field application of novel non-silicone antifoam chemistries for high heavy oil storage tanks in Northern Alberta*", SPE/PS-CIM/CHOA Int. Thermal Operations and heavy Oil Sym., Calgary, Alberta, Canada, (2008).

Fields J. E., "*Hydrocarbon oils of reduced foaming properties*", U.S. Pat. No. 3,166,508, Jan. 19, (1965).

Pillon L. Z. and Asselin E., "*Antifoaming agents for lubricating oils*", U.S. Pat. No. 5,766,513, Jun. 16, (1998).

Grolitzer M. and Zhao M., "*Foaming-resistant hydrocarbon oil compositions*", E. P. Patent 1029030B1, Aug. 23, (2000).

Fang J. Z. and Zhao M., "*Foaming-resistant hydrocarbon oil compositions*", U.S. Pat. No. 7,700,527, Apr. 20, (2010).

Sweeney M. W, "*Polyacrylates and waxy residual fuel compositions thereof*", U.S. Pat. No. 3,951,929, Apr. 20, (1976).

ASTM D-892-13, "*Standard test method for foaming characteristics of lubricating oils*".

ASTM D-6082-12, "Standard test method for high temperature foaming characteristics of lubricating oils.

SUMMARY OF THE INVENTION

Since the stability of the lamellae (thin liquid film between two bubbles) that constitute the foam in the petroleum is strongly influenced by the viscosity of the fluid, in the present invention acrylics compounds of adjusted molecular weight to the characteristics of the crude oil as inhibitors and suppressors of foam formation in petroleums with different densities between 10 and 40° API were evaluated. The compounds were synthesized by the process of semicontinuous emulsion polymerization described in U.S. Patent Publication No. 2011/0067295 to obtain homopolymers based on alkyl acrylates. This process of semi-continuous emulsion synthesis has, moreover, the great advantage of using water as a dispersion medium instead of organic solvents that are expensive and harmful to the environment. Furthermore, determinations were made of the foam suppressing capacity of the acrylic homopolymers in "live" crude oils (crude oils containing natural gases that have been dissolved in the oil for centuries in the deposit), under conditions similar to the real conditions of the gas-liquid separator employed in the petroleum industry. Thus, Applicants demonstrate rigorously that homopolymers based on acrylate have a marked efficiency as foam suppressors and foam inhibitors, in some cases even major to the silicones (more efficiently in 25% approximately) used in the petroleum industry. Unlike to the silicone antifoaming agents used for foam elimination in petroleum, the acrylic compounds do not generate inorganic deposits and do not deactivate catalysts in refining processes.

Thus, Applicants have developed new antifoaming agents based on alkyl acrylates, without silicon, which are a suitable replacement for foaming inhibitors based on silicone, thus providing a solution to the problems that face the production and refining of petroleum in Mexico.

The present invention is directed to an antifoaming formulation and to a method of inhibiting or reducing foaming of crude oil having a density of 10 to 40° API by the addition of the antifoaming formulation to the crude oil. The antifoaming formulation is particularly suitable for inhibiting foaming of crude oil containing natural gas or volatile compounds that can produce foaming. The antifoaming formulation comprises an alkyl acrylate homopolymer having alkyl acrylate repeating units, and an organic solvent. The antifoaming formulation is preferably in the absence of or substantially in the absence of water and in the absence of silicones.

The homopolymer of the antifoaming formulation has a molecular weight of about 1,000 to 180,000 Daltons, and preferably about 7,000 to 120,000 Daltons. The antifoaming formulation includes the homopolymers in an amount of about 10 to 50 wt %, and preferably about 20 to 40 wt % based on the total weight of the formulation.

The antifoaming formulation of the invention is added to and mixed with the crude oil to form a mixture where the homopolymers is added in an amount effective to inhibit foaming of the crude oil. The formulation is typically added to the crude oil in an amount to provide a concentration of the homopolymers of about 20 to 2,000 ppm, preferably about 100 to 1,500 ppm, and more preferably about 200 to 1,000 ppm based on the amount of the crude oil.

Silicones, because of the presence of silicon, present problems such as catalyst deactivation and the formation of deposits in subsequent stages of the refining process. This situation has had the consequence that, nowadays, the refineries in Mexico and elsewhere all over the world modify or forbid the application of these inorganic polymers and they have required new antifoaming agents with low silicon content or even totally free in composition of this element.

BRIEF DESCRIPTION OF THE DRAWINGS

In the first instance.

FIG. 1 shows the performance of the homopolymers identified as HAB-2, HAB-3, HAB-4 and HAB-5 in their function as antifoaming agents in "live" crude oil with 15.00° API (heavy) evaluated at 500 ppm dose and compared with a commercial product IMP-Si, silicon base;

FIG. 2 shows the performance of the homopolymers identified as HAH-2, HAH-3, HAH-4 and HAH-5 functioning as crude oil antifoaming agents in "live" crude oil with 15.00° API (heavy) tested at 750 ppm and also compared to the IMP-Si silicone-based commercial product;

FIG. 3 sets out the performance of the homopolymers identified as HAEM-2, HAEM-3, HAEM-4 and HAEM-5, other antifoaming agents in "live" crude oil and heavy with 15.00° API at a concentration of 1500 ppm, compared to the IMP-Si silicone base commercial product at 500 ppm;

FIG. 4 appears the performance of HAEF-2, HAEF-3, HAEF-4 and HAEF-5 homopolymers like antifoaming agents in heavy crude oil and "live" crude oil with 15.00° API at a concentration of 1500 ppm, compared with the commercial product IMP-Si silicone base dosed at 500 ppm;

FIG. 5 shows the performance of the HAB-2, HAB-3, HAB-4 and HAB-5 homopolymers like antifoaming agents in super-heavy and "live" crude oil of 12.84° API, dosed at 500 ppm and compared to the commercial product IMP-Si silicone base;

FIG. 6 shows the performance of HAH-2, HAH-3, HAH-4 and HAH-5 homopolymers like antifoaming agents in super-heavy and "live" crude oil with 12.84° API, evaluated at 750 ppm and compared to the commercial product IMP-Si silicone based at 500 ppm;

FIG. 7 shows the performance HAEM-2, HAEM-3-4 and HAEM HAEM-5 homopolymers as antifoaming agents in super-heavy and "live" crude oil of 12.84° API at a concentration of 1000 ppm, compared to the commercial product IMP-Si silicone based evaluated at 500 ppm; and FIG. 8 shows the performance of HAEF-2, HAEF-3, HAEF-4 and HAEF-5 homopolymers like antifoaming agents in super-heavy and "live" crude oil of 12.84° API at 1500 ppm, compared with the commercial silicone-based IMP product evaluated at 500 ppm.

DETAILED DESCRIPTION OF THE INVENTION

Figure 1:
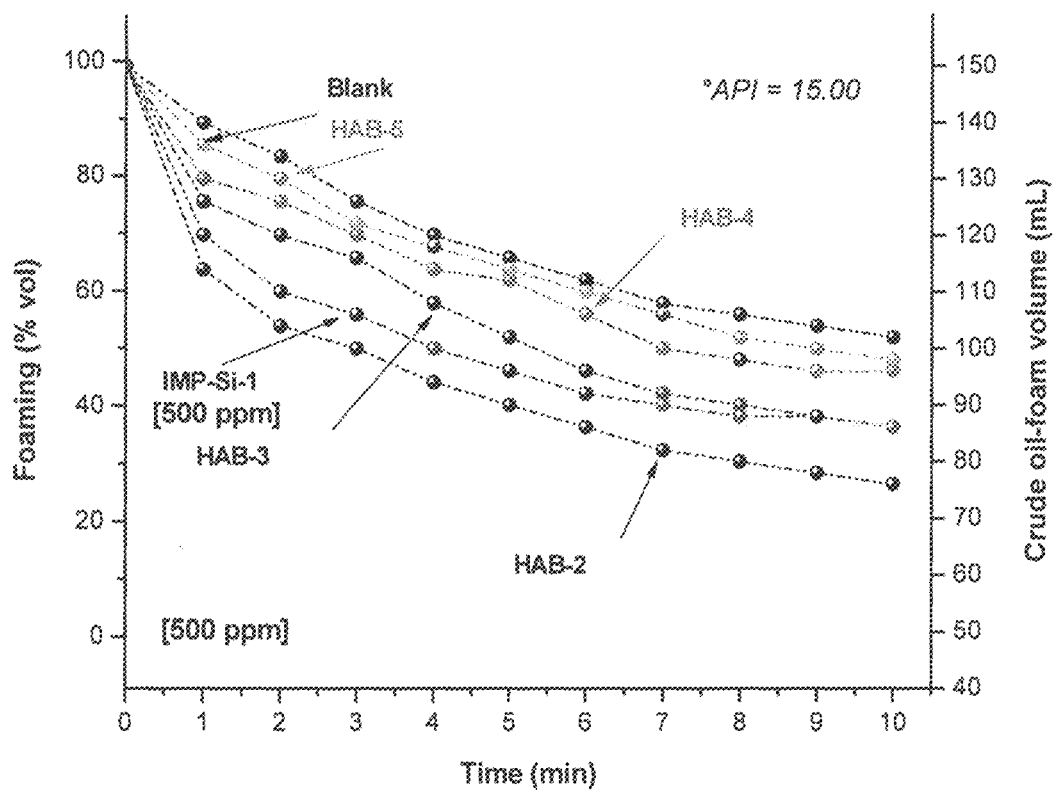
FIGS. 1 to 4 are shown, where the results of the evaluations conducted to determine the performance of these polymers based on alkyl acrylates as new antifoaming agents for heavy crude oils with 15.00° API. Similarly.

The method described below was used for the preparation of the homopolymer of alkyl acrylate formulation as an antifoaming agent. This method is illustrative but not limitative.

Homopolymers based on alkyl acrylates are synthesized by semi-continuous emulsion polymerization in latex form, synthetic method described in U.S. Patent Publication No. 2011/0067295, which is hereby incorporated by reference. Latex is a dispersion of polymer particles in water, easy to process because it avoids the use of organic solvents. The final latex is preferably dewatered by distillation at a temperature of 80 to 120° C., and a suitable organic solvent it is added to allow the final application as an antifoaming agent in crude oils with densities between 10 to 40° API, preferably using solvents having a boiling point in the range of 35 to 200° C., such as: dichloromethane, methanol, ethanol, isopropanol, chloroform, benzene and its derivatives, toluene, xylene, jet fuel, naphtha, individually or mixtures thereof. The amount of homopolymer in the solution is in a range preferably from 10 wt % to 50 wt %, and more preferably 20 wt % to 40 wt %.

Formula (1) shows the structure of the different acrylic homopolymers of the present invention, preferably with alkyl esters of acrylic acid or methacrylic acid:

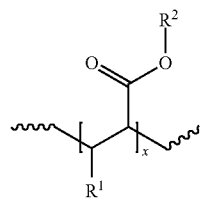

(1)

where:
$R^1$ and $R^2$ are independent radicals represented by the groups listed below:
$R^1$=H (hydrogen), $CH_3$ (methyl);
$R^2$=$CH_3$ (methyl), $C_2H_5$ (ethyl), $C_4H_9$ (n-butyl, isobutyl), $C_6H_{13}$ (n-hexyl, iso-hexyl),
$C_8H_{17}$ (2-ethyl-hexyl) $C_8H_{17}$ (n-octyl), $C_{10}H_{21}$ (n-decyl, iso-decyl), $C_{12}H_{25}$ (n-dodecyl),
$C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy) ethyl). This aliphatic chain can contain heteroatoms from the ether group and benzene type aromatic rings or heteroatomic rings from ether type.

and where:
x=is a number from 2 to 900, preferably 20 to 850, even more preferably from 60 to 600. In addition, the number molecular weights fall within the range of 1,000 to 180,000 Daltons, preferably between 7,000 and 120,000 Daltons.

The following describes, by way of example, implying no limitation, the monomers used in the synthesis of homopolymers objects of the present invention: methyl acrylate, ethyl acrylate, butyl acrylate, n-amyl acrylate, isobornyl acrylate, isobutyl acrylate, tert-butyl acrylate, hexyl acrylate, 2-ethylhexyl acrylate, 3,5,5-trimethylhexyl acrylate, 2-methoxy ethyl acrylate, 2-phenoxyethyl acrylate, 4 tert-butylcyclohexyl acrylate, octyl acrylate, isodecyl acrylate, decyl acrylate, lauryl acrylate, tridecyl acrylate, octadecyl and behenyl acrylate. The water in the resulting homopolymer is removed by distillation at a temperature of 80 to 120° C., and preferably at 90 to 110° C.

The method involves adding an effective amount of homopolymer based on alkyl acrylate to crude oils with densities between 10 to 40° API, preferably from 12 to 22° API, at concentrations between 10 and 2000 ppm, preferably 100 to 1500 and more preferably 200 to 1000 ppm, to inhibit foaming.

The present invention will be described with reference to a number of specific examples which will be considered only as illustrative and not restrictive of the invention. After obtaining the polymer based on alkyl acrylate, were characterized using the following instrumental methods:

1. Size exclusion chromatograph (SEC) Agilent® model 1100, with a column type PLgel and using tetrahydrofuran (THF) as eluent, to calculate the molecular weight distributions of the polymers and the polydispersity index (I).
2. Fourier transformed infrared spectrometer, Thermo Nicolet® model AVATAR 330, using the method of film technique with the OMNIC software 7.0® version.

The following describes the molecular weights, polydispersity indexes in Tables 1, 2, 3 and 4, and their spectroscopic characteristics from some different alkyl acrylate polymers synthesized, which does not mean any limitation:

Table 1 shows the results for the alkyl polyacrylate ($R^1$=hydrogen, $R^2$=n-butyl), which does not mean any limitation:

TABLE 1

Molecular weight (Mn) and polydispersity indexes (I) of polymers determined by SEC.

| Polymer | Mn (Daltons) | I |
|---|---|---|
| HAB-1 | 102 250 | 5.24 |
| HAB-2 | 45 678 | 1.81 |
| HAB-3 | 32 500 | 2.05 |
| HAB-4 | 12 050 | 1.84 |
| HAB-5 | 8 956 | 1.69 |

Table 2 presents the results for the alkyl polyacrylate ($R^1$=hydrogen, $R^2$=2-ethyl-hexyl), which does not mean any limitation:

TABLE 2

Molecular weight in number (Mn) and polydispersity indexes (I) of the polymers determined by SEC.

| Polymer | Mn (Daltons) | I |
|---|---|---|
| HAH-1 | 85 678 | 3.72 |
| HAH-2 | 43 567 | 2.26 |
| HAH-3 | 18 768 | 2.26 |
| HAH-4 | 9 800 | 2.38 |
| HAH-5 | 5 095 | 3.99 |

Table 3 shows the results for the polyacrylate alkyl ($R^1$=hydrogen, $R^2$=2-methoxyethyl), which does not mean any limitation:

TABLE 3

Molecular weight in number (Mn) and polydispersity indexes (I) of the polymers determined by SEC.

| Polymer | Mn (Daltons) | I |
|---|---|---|
| HAEM-1 | 119 780 | 3.83 |
| HAEM-2 | 76 890 | 1.84 |
| HAEM-3 | 43 300 | 2.35 |
| HAEM-4 | 12 987 | 1.75 |
| HAEM-5 | 6 973 | 1.51 |

Table 4 presents the results for the alkyl polyacrylate ($R^1$=hydrogen, $R^2$=phenoxyethyl), which does not mean any limitation:

TABLE 4

Molecular weight in number (Mn) and polydispersity indexes (I) of the polymers determined by SEC.

| Polymer | Mn (Daltons) | I |
|---|---|---|
| HAEF-1 | 87 690 | 2.58 |
| HAEF-2 | 34 347 | 2.33 |
| HAEF-3 | 16 911 | 3.63 |
| HAEF-4 | 8 337 | 2.77 |
| HAEF-5 | 5 939 | 4.44 |

EXAMPLES

The following examples are presented to illustrate the spectroscopic properties of the homopolymers based on alkyl acrylates and its application as antifoaming agents in crude oils with densities in between 10 to 40° API. These examples should not be considered as limiting the claims herein.

HAB-1

Poly (alkyl acrylate) I.R. $\nu$ cm$^{-1}$: 2983, 2955, 2930, 2870, 1731, 1448, 1394, 1373, 1247, 1155, 1062, 932.

HAB-2

Poly (alkyl acrylate) I.R. $\nu$ cm$^{-1}$: 2982, 2956, 2930, 2871, 1730, 1446, 1395, 1372, 1247, 1156, 1063, 932.

HAB-3

Poly (alkyl acrylate) I.R. $\nu$ cm$^{-1}$: 2983, 2954, 2929, 2871, 1730, 1449, 1392, 1370, 1248, 1156, 1061, 934.

HAB-4

Poly (alkyl acrylate) I.R. $\nu$ cm$^{-1}$: 2981, 2954, 2932, 2874, 1729, 1446, 1392, 1371, 1245, 1154, 1060, 932.

HAB-5

Poly (alkyl acrylate) I.R. $\nu$ cm$^{-1}$: 2982, 2952, 2932, 2871, 1732, 1447, 1393, 1371, 1249, 1154, 1060, 929.

HAH-1

Poly (alkyl acrylate) I.R. $\nu$ cm$^{-1}$: 2980, 2953, 2930, 2870, 1733, 1448, 1394, 1373, 1247, 1150, 1066, 932.

HAH-2

Poly (alkyl acrylate) I.R. $\nu$ cm$^{-1}$: 2988, 2955, 2930, 2871, 1729, 1446, 1395, 1375, 1247, 1165, 1074, 932.

HAH-3

Poly (alkyl acrylate) I.R. $\nu$ cm$^{-1}$: 2985, 2951, 2929, 2871, 1733, 1449, 1392, 1370, 1248, 1163, 1064, 934.

HAH-4

Poly (alkyl acrylate) I.R. $\nu$ cm$^{-1}$: 2981, 2954, 2932, 2874, 1729, 1444, 1392, 1370, 1245, 1154, 1060, 932.

HAH-5

Poly (alkyl acrylate) I.R. $\nu$ cm$^{-1}$: 2983, 2952, 2932, 2871, 1731, 1448, 1390, 1373, 1252, 1159, 1055, 929.

HAEM-1

Poly (alkyl acrylate) I.R. $\nu$ cm$^{-1}$: 2980, 2948, 2930, 2820, 1729, 1456, 1381, 1252, 1173, 1125, 1026, 862.

HAEM-2

Poly (alkyl acrylate) I.R. $\nu$ cm$^{-1}$: 2980, 2950, 2930, 2833, 1730, 1448, 1390, 1253, 1170, 1131, 1028, 859.

HAEM-3

Poly (alkyl acrylate) I.R. $\nu$ cm$^{-1}$: 2982, 2953, 2929, 2826, 1730, 1453, 1384, 1259, 1174, 1127, 1025, 864.

HAEM-4

Poly (alkyl acrylate) I.R. $\nu$ cm$^{-1}$: 2979, 2951, 2932, 2832, 1729, 1456, 1382, 1260, 1176, 1125, 1026, 862.

HAEM-5

Poly (alkyl acrylate) I.R. $\nu$ cm$^{-1}$: 2981, 2952, 2930, 2830, 1731, 1452, 1380, 1253, 1178, 1130, 1024, 860.

HAEF-1

Poly (alkyl acrylate) I.R. $\nu$ cm$^{-1}$: 2948, 2877, 1733, 1451, 1410, 1374, 1173, 1125, 1030, 862.

HAEF-2

Poly (alkyl acrylate) I.R. ν cm$^{-1}$: 2954, 2869, 1731, 1457, 1404, 1378, 1171, 1120, 1033, 860.

HAEF-3

Poly (alkyl acrylate) I.R. ν cm$^{-1}$: 2948, 2873, 1731, 1452, 1414, 1371, 1173, 1122, 1031, 861.

HAEF-4

Poly (alkyl acrylate) I.R. ν cm$^{-1}$: 2953, 2872, 1730, 1452, 1411, 1371, 1174, 1122, 1028, 863.

HAEF-5

Poly (alkyl acrylate) I.R. ν cm$^{-1}$: 2948, 2877, 1729, 1452, 1410, 1377, 1173, 1125, 1032, 862.

Polymer Evaluation as Anti-Foaming Agents in Heavy Crude Oil and Super-Heavy

The crude oils employed in the evaluations of the antifoaming agents are contained in a 4 L metal cylinder of stainless steel; oil samples were taken from the well at sampling conditions, of 76.5° C. and a pressure of 6 kg/cm$^2$.

Homopolymers based on alkyl acrylate were evaluated as inhibitors of foam formation in "live" heavy and super-heavy crude oils, using an apparatus for measuring the foam and an assessment procedure that Applicants implement (Mexican patent MX/a/2013/013966). The metallic cylinder containing the crude oil were provided with a nitrogen gas supply line, heating jackets and a vent line for the crude oil where the antifoaming agents are fed. The foaming process is induced by preheating the metal cylinder of stainless steel with an outside temperature in a range of 40 to 150° C., preferably between 50 and 120° C., and pressurizing the system with nitrogen gas at a pressure in a range of 80 to 150 psi, preferably between 90 and 130 psi, remaining at these conditions for two hours before starting the test. Once the metal cylinder is at considerable temperature, the crude oil is poured using the output line or vent line, the antifoaming agent is fed into the outlet pipe through a septum-type connection (diaphragm made of a material that allows the entrance of a needle and reseals on removal) by means of a syringe at a desired dosage (10 to 2000 ppm). The foam is formed due to the sudden drop in pressure from the crude oil content in the metallic pressurized container at atmospheric pressure.

150 mL of crude oil are released from the metal cylinder with foam formed, being poured into a graduated cylinder in approximately 20 to 40 s, preferably between 25 and 35 s. It starts measuring the foam abatement, recording the volumes registered in the graduated cylinder, every minute for a period of 10 min. Finally, once the test is finished, the crude oil in the cylinder remains still until there is no more foam and the residual oil is measured.

Heavy and super-heavy crude oils were characterized as follows:

TABLE 5

Physical and physicochemical characterization of the crude oils.

| Property | Heavy crude oil | Super-heavy crude oil |
|---|---|---|
| °API gravity | 15.00 | 12.84 |
| Salt content (lbs/1000 bls) | 49.54 | 11.48 |
| Paraffin wax content (wt %) | 4.32 | 4.75 |
| Pour point (° C.) | −12 | −3 |
| Kinematic viscosity (mm$^2$/s) @ 25° C. | 2309.52 | 3423.58 |
| Cryoscopy molecular mass (g/mol) | 398.00 | 426.44 |
| n-heptane insolubles (wt %) | 10.45 | 16.58 |
| SARA analysis | | |
| Saturates (wt %) | 6.06 | 10.28 |
| Aromatics (wt %) | 5.95 | 26.65 |
| Resins (wt %) | 71.71 | 45.79 |
| Asphaltenes (wt %) | 16.22 | 17.25 |

Different concentrated dissolutions of each polymer were prepared, from 5 to 40 wt %, using solvents having a boiling point in the range of 35° C. to 200° C., preferably dichloromethane, methanol, ethanol, isopropanol, chloroform, benzene, toluene, xylene, jet fuel, naphtha, either individually or mixtures thereof, so that smaller volumes of solution were added in the test and it was kept out that the effect of the solvent influenced the foam breakdown. Polymers based on alkyl acrylate were evaluated at concentrations ranging from 10 to 2000 ppm. Polymers based on alkyl acrylates were evaluated simultaneously, in a way of comparison, with a commercial silicon-based antifoaming agent (IMP-Si).

By way of proof, which does not imply any limitation, are shown in FIGS. 1, 2, 3 and 4 the results of the evaluations of the HAB, HAH, HAEF and HAEM homopolymers as antifoaming agents in heavy crude oil (API gravity=15), at the following dosages of 500, 750, 1000 and 1500 ppm; however, these homopolymers have been applied from 10 to 2000 ppm. In this crude oil the commercial silicon based antifoaming agent at 500 ppm inhibits the foam in approximately 20 to 25% faster than the control.

FIGS. 5, 6, 7 and 8 show the results of the evaluations of HAB, HAH, HAEF and HAEM homopolymers, as antifoaming agents in a super-heavy crude oil (API gravity=12.84) dosed at 500, 750 and 1500 ppm, respectively; however, these homopolymers have been applied from 10 to 2000 ppm. The commercial silicon based antifoaming agent at 500 ppm inhibits the foam formation 20% faster than the control. The efficiency of polymers based on alkyl acrylates is obtained by comparison with the control.

FIG. 1 shows that polymer HAB-2 is the most efficient inhibitor of foam formation, this one abates the foam approximately 30% faster than the control, even over the commercial silicone IMP-Si product, both at 500 ppm. Thus it is also reported that decreasing the molecular mass from HAB-2 to HAB-5, the antifoaming efficiency decreases until the polymer HAB-5 behaves as a blank.

Figure 2:
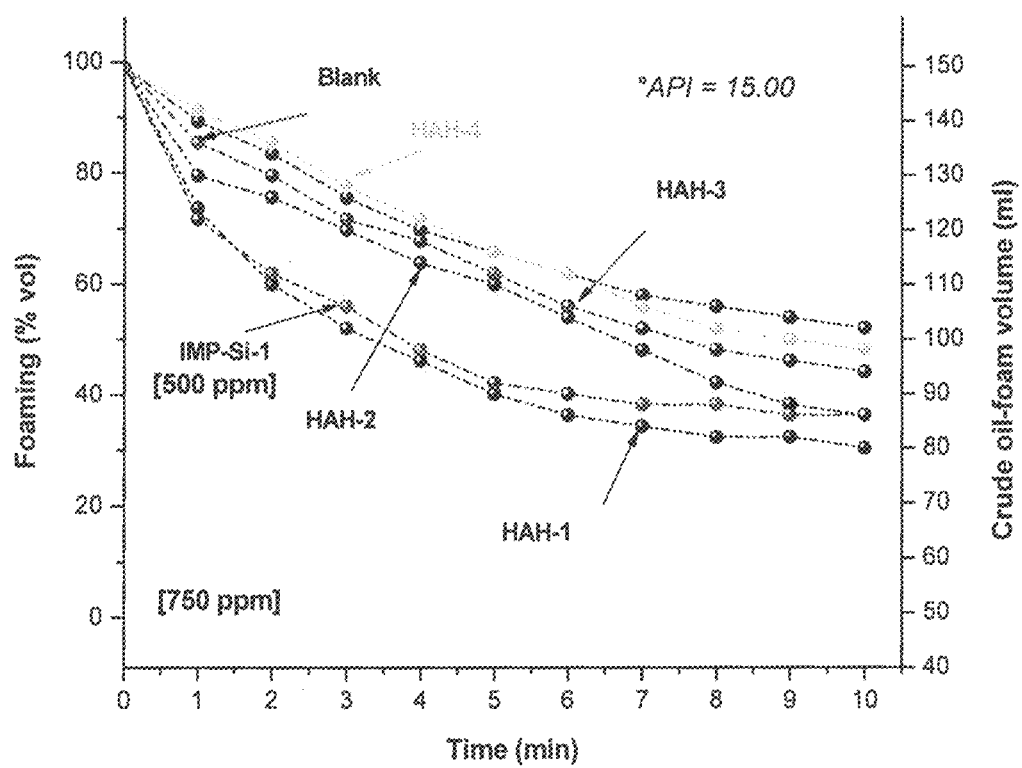

FIG. 2 shows that polymer HAH-2 at 750 ppm as efficient as foam inhibitor compared with the commercial silicone IMP-Si product at 500 ppm, both fold down the foam around 25% faster than the control. Again it is observed that decreasing the molecular mass from HAH-2 to HAH-5, the antifoaming efficiency decreases until the polymer HAH-5 behaves like the control.

Figure 3:
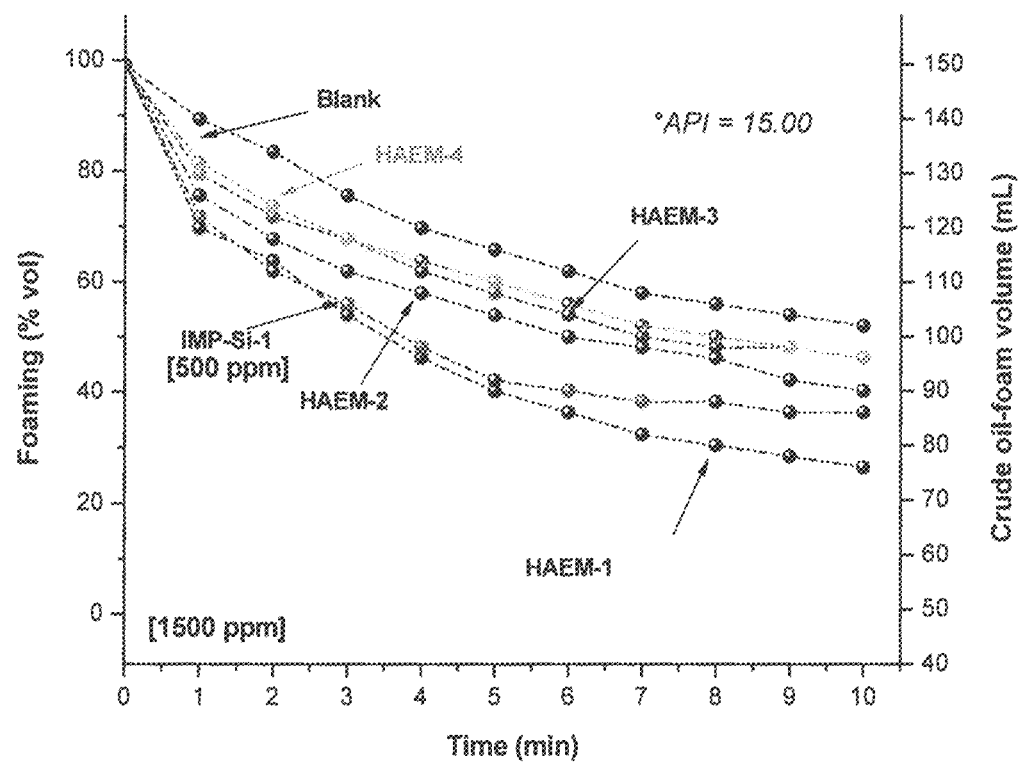

In FIG. 3, it is observed that polymer HAEM-2 is the most efficient of these polymers as an antifoaming agent, although it behaves like the commercial silicone IMP-Si product, again both molecules breakdown the foam around 25% faster than the control; however, both samples were dosed at 1500 ppm and 500 ppm, respectively. Again it is observed that decreasing the molecular mass from HAEM-2 to HAEM-5, the efficiency as foam inhibitor decreases again by decreasing the molecular weight.

Figure 4:
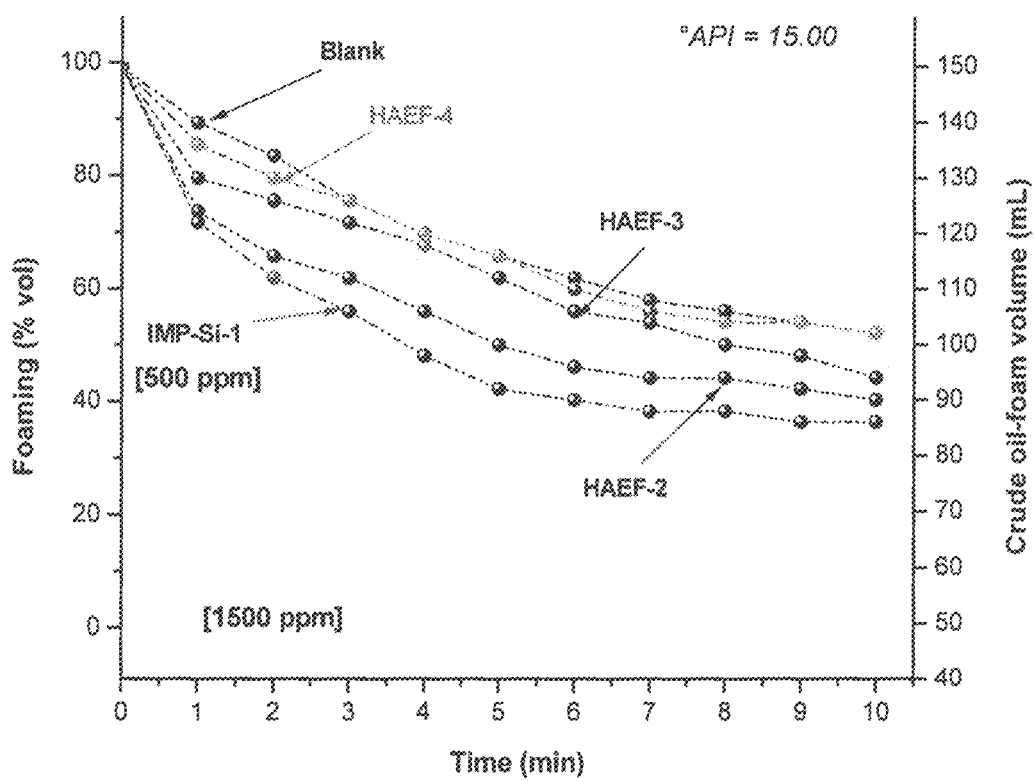

In FIG. 4, it is observed that polymer HAEF-3 has good performance as foam inhibitor at 1500 ppm; however, its performance is approximately 15% faster than the control, is less than the commercial silicone IMP-Si product at 500 ppm. Again it is observed that decreasing the molecular mass from HAEF-3 to HAEF-5, the antifoaming efficiency decreases until the polymer HAEF-5 behaves like the control.

Figure 5:
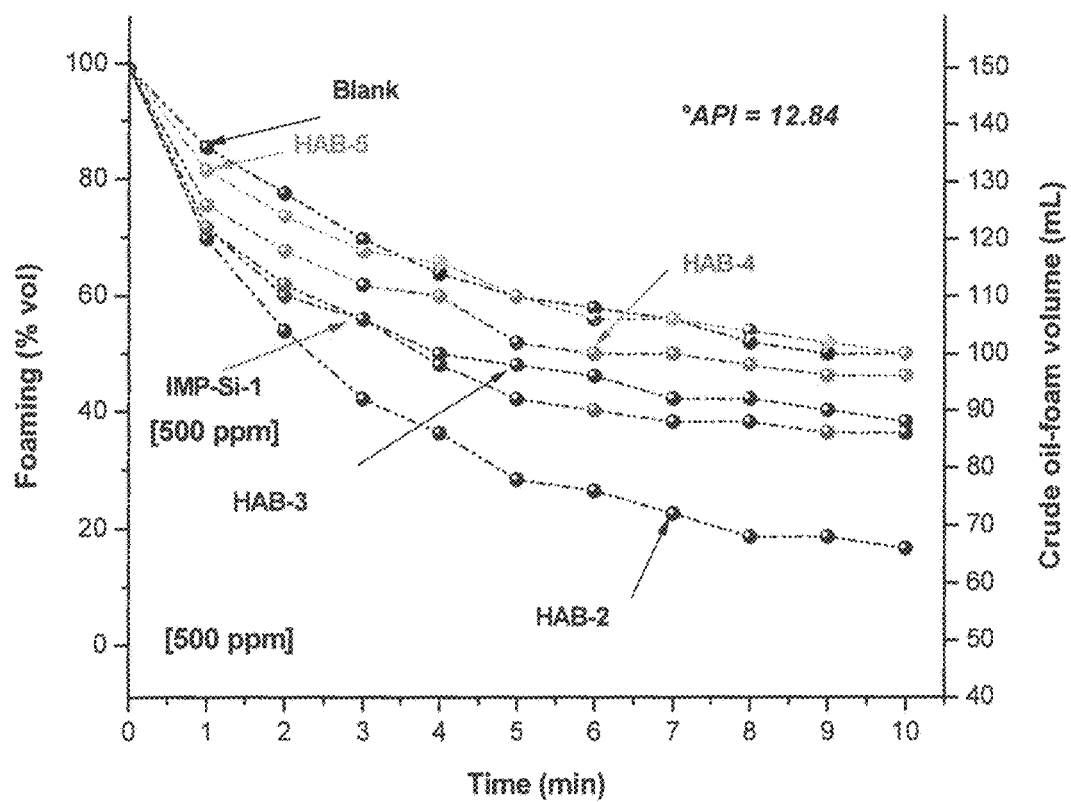
FIGS. 5 to 8 present the results of the polymers based on alkyl acrylates evaluated in super-heavy crude oil with 12.84° API.

In FIG. 5, it is observed that polymer HAB-2 is the most efficient of all as foam inhibitor, inhibiting the foam 40 to 50% faster than the control, even above the commercially silicone IMP-Si product, both at 500 ppm. Thus it is also reported that decreasing the molecular mass from HAB-2 to HAB-5, the efficiency as foam inhibitor decreases until polymer HAB-5 behaves as the control.

Figure 6:
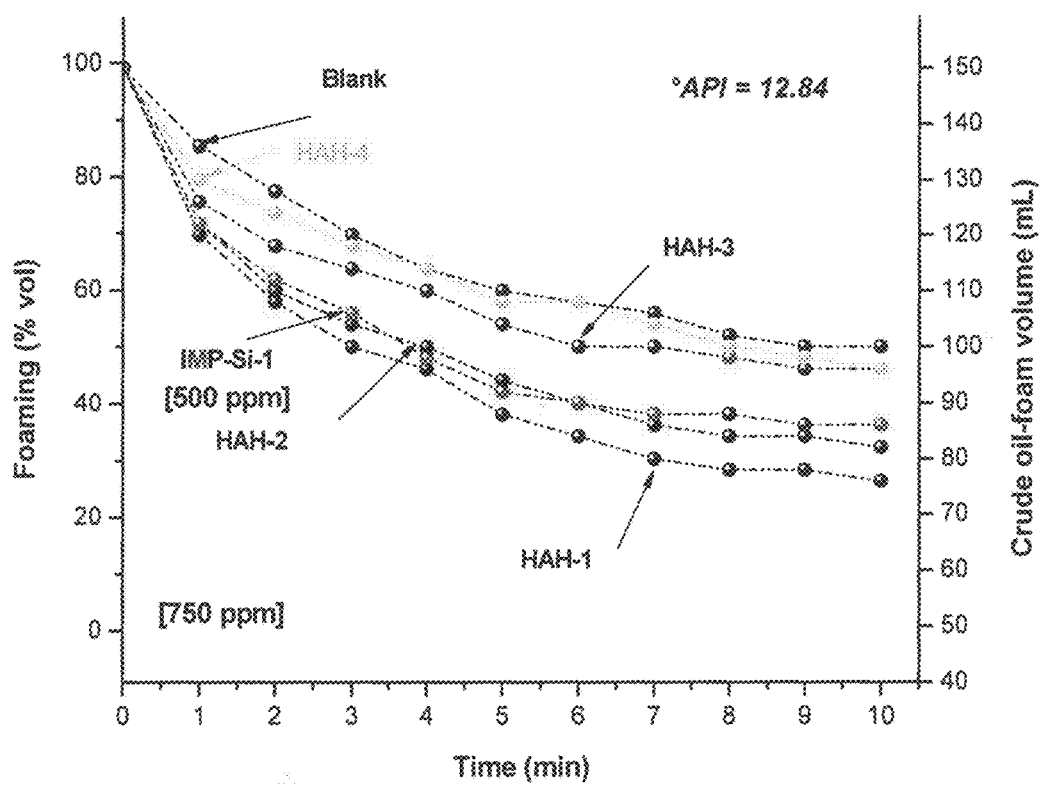

In FIG. 6, it is observed that polymer HAH-1 at 750 ppm is the most efficient of all as foam inhibitor even over the commercial silicone IMP-Si product at 500 ppm, but lower than its counterpart HAB-2. Again it is observed that decreasing the molecular mass from HAH-2 to HAH-5, the efficiency as foam inhibitor decreases until the polymer HAH-5 behaves like the control.

Figure 7:
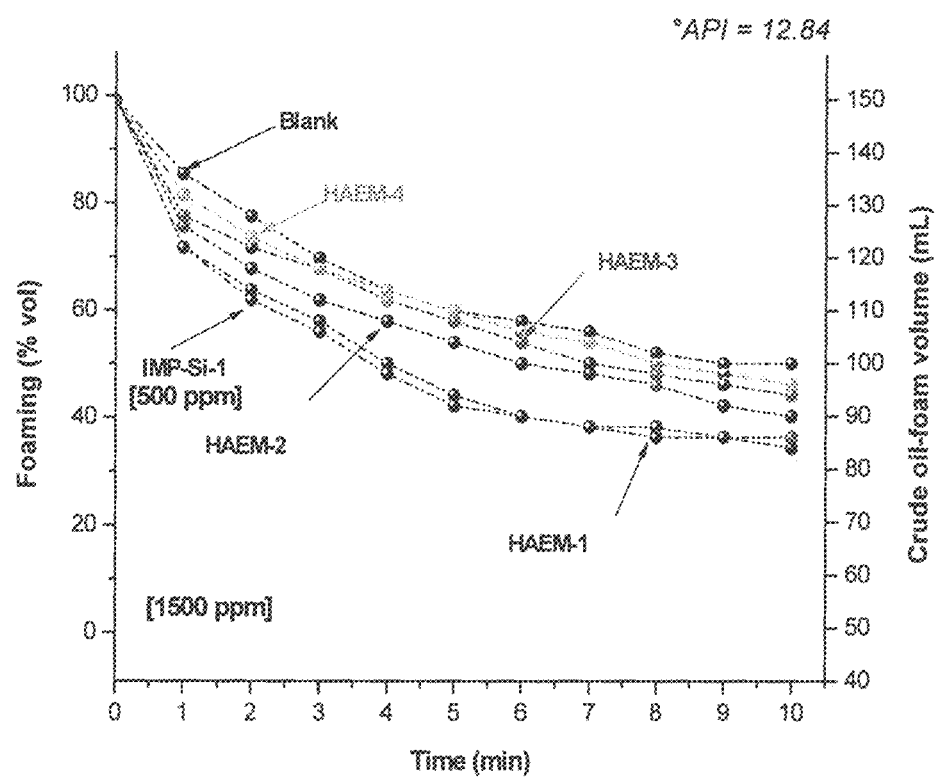

In FIG. 7, it is observed that the polymer HAEM-2 is the most efficient of these polymers as anti-foamer, although dosed at 1500 ppm behaving as the commercial product IMP-Si based silicone is dosed only 500 ppm, both more efficient by 20%. Again it is observed that by decreasing the molecular mass of the HAEM HAEM-2-5, the efficiency decreases as foam inhibitor again by decreasing the molecular weight.

Figure 8:
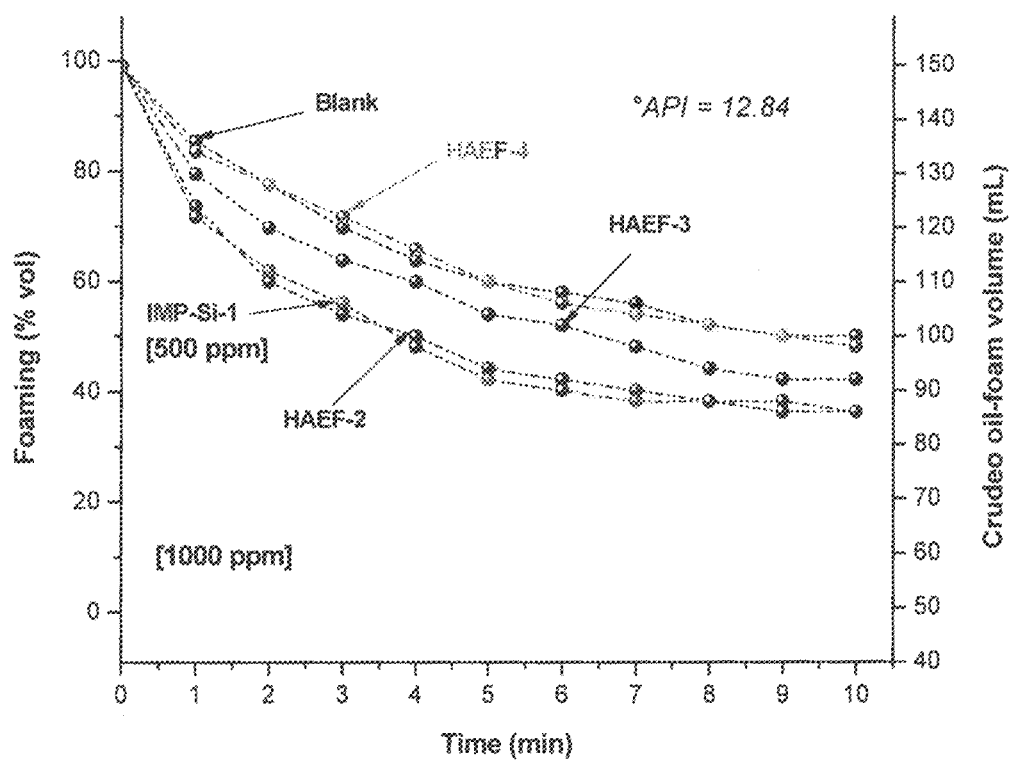

In FIG. 8, it is observed that the polymer HAEF-3 is as efficient as foam inhibitor compared to the commercial product IMP-Si based silicone foam both folded down by 20% faster compared to the control, dosed at 1000 and 500 ppm. Again it is observed that by decreasing the molecular mass of the HAEF HAEF-3-5, the efficiency decreases as foam inhibitor until the polymer HAEF-5 behaves like the control.

Applicants also made mixtures of homopolymers based on alkyl acrylate of the present invention, as an example, does not imply any limitation, we conducted the mixture of HAB-2 and HAH-2 evaluated as antifoaming agent in "live" heavy and super-heavy crude oils, 15 and 12.84° API, respectively, dosed at 500 ppm in both crude oils, this mixture had a better performance like foam inhibitor compared with the commercial silicon based antifoaming agent (500 ppm) at 10 and 20% more efficient, respectively.

What is claimed is:

1. A process for inhibiting or reducing foam formation comprising the step of feeding crude oil containing natural gas or volatile compounds and having a density of 10 to 40° API to a gas-liquid separation apparatus at a temperature of 50 to 120°, and adding an antifoaming agent formulation in an amount of 100 to 1500 ppm to reduce foam formation by at least 20% by volume relative to the crude oil without the antifoaming agent, said antifoaming agent formulation consisting of an alkyl acrylate homopolymer of formula (1) having a molecular weight of 1,000 to 180,000 Daltons dispersed in an organic solvent and substantially in the absence of water

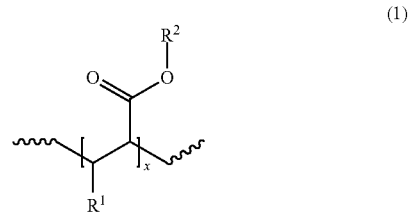

where:

$R^1$ and $R^2$ are independent radicals where $R^1$ is selected from the group consisting of H (hydrogen) and $CH_3$ (methyl);

$R_2$ is selected from the group consisting of $CH_3$ (methyl), $C_2H_5$ (ethyl), $C_4H_9$ (n-butyl, isobutyl), $C_6H_{13}$ (n-hexyl, iso-hexyl), $C_8H_{17}$ (2-ethyl-hexyl) $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), and $C_5H_{11}O_2$ (2-(2-methoxyethoxy)-ethyl); and x is an integer number from 2 to 900.

2. The process of claim 1, wherein X is 20 to 850.
3. The process of claim 1, wherein X is 60 to 600.
4. The process of claim 1, wherein the homopolymers are obtained from monomers consisting of monomers selected from the group consisting of methyl acrylate, ethyl acrylate, butyl acrylate, n-amyl acrylate, isobornyl acrylate, isobutyl acrylate, tert-butyl acrylate, hexyl acrylate, 2-ethylhexyl acrylate, 3,5,5-trimethylhexyl acrylate, 2-methoxy ethyl acrylate, 2-phenoxyethyl acrylate, 4-tert-butylcyclohexyl acrylate, octyl acrylate, isodecyl acrylate, decyl acrylate, lauryl acrylate, tridecyl acrylate, octadecyl and behenyl acrylate.
5. The process of claim 1, wherein the homopolymers have a molecular mass 7,000 to 120,000 Daltons.
6. The process of claim 1, wherein the organic solvent has a boiling point of 35 to 200° C.
7. The process of claim 1, wherein the organic solvent is selected from the group consisting of dichloromethane, methanol, ethanol, isopropanol, chloroform, benzene and derivatives, toluene, xylene, jet fuel, naphtha, either individually and in mixtures thereof.
8. The process of claim 1, wherein the concentration of the homopolymer on a dry base is 10 to 50 wt % based on the total weight of the antifoaming agent formulation.
9. The process of claim 1, wherein the homopolymer is included in an amount of 20 to 40 wt % based on the weight of the antifoaming agent formulation.
10. The process of claim 1, wherein the crude oil has a density between 12 to 22° API.
11. The process of claim 1, wherein the antifoaming agent comprises a mixture of two or more of said homopolymers.
12. The process of claim 1, wherein said antifoaming agent formulation is combined with said crude oil in an amount to provide a homopolymer concentration of 200 to 1,000 ppm.
13. A process for inhibiting or reducing foam formation of heavy crude oil in a gas-liquid separation apparatus, said method comprising the step of introducing an antifoaming agent composition into the gas-liquid separation apparatus containing crude oil containing natural gas or volatile compound and having a density of 10 to 4020 API in an amount effective to reduce foam formation by at least in 20% by volume relative to the crude oil without the antifoaming agent, wherein said antifoaming agent composition is added in an amount of 100 to 1500 ppm based on the amount of crude oil, and consists of an alkyl acrylate homopolymer of formula (1) having a molecular weight of 1,000 to 180,000 Daltons dispersed in an organic solvent

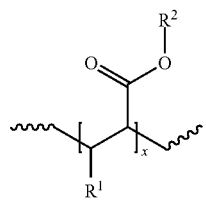
(1)

where:
$R^1$ and $R^2$ are independent radicals where
$R^1$ is selected from the group consisting of H (hydrogen) and $CH_3$ (methyl);
$R^2$ is selected from the group consisting of behenyl, 2-pheneoxyethyl, 2-methoxyethyl, 2-(2-methoxyethoxy)-ethyl, isobornyl, and butyl cyclohexyl; and
x is an integer number from 2 to 900.

14. The process of claim 13, wherein $R^2$ is 2-phenoxyethyl.

* * * * *